(12) United States Patent
Lahiri et al.

(10) Patent No.: US 12,475,100 B2
(45) Date of Patent: Nov. 18, 2025

(54) USING AD-HOC STORED PROCEDURES FOR ONLINE TRANSACTION PROCESSING

(71) Applicant: Twilio Inc., San Francisco, CA (US)

(72) Inventors: Mayank Lahiri, San Francisco, CA (US); Jayakrishnan Balakrishnan Nair, San Ramon, CA (US); Padmaja U. Mantravadi, Cupertino, CA (US)

(73) Assignee: Twilio Inc., San Francisco, CA (US)

( * ) Notice: Subject to any disclaimer, the term of this patent is extended or adjusted under 35 U.S.C. 154(b) by 106 days.

(21) Appl. No.: 17/478,233

(22) Filed: Sep. 17, 2021

(65) Prior Publication Data

US 2023/0054501 A1 Feb. 23, 2023

Related U.S. Application Data

(60) Provisional application No. 63/235,049, filed on Aug. 19, 2021.

(51) Int. Cl.
*G06F 16/23* (2019.01)
*G06F 16/242* (2019.01)
*G06F 16/25* (2019.01)

(52) U.S. Cl.
CPC ...... *G06F 16/2343* (2019.01); *G06F 16/2358* (2019.01); *G06F 16/2365* (2019.01);
(Continued)

(58) Field of Classification Search
CPC ............ G06F 16/2343; G06F 16/2358; G06F 16/2365; G06F 16/2379; G06F 16/2443; G06F 16/252
(Continued)

(56) References Cited

U.S. PATENT DOCUMENTS

| 5,553,234 A | * | 9/1996 | Cotner | ............... G06F 9/466 707/999.001 |
| 5,835,755 A | * | 11/1998 | Stellwagen, Jr. | ............................. G06F 16/24532 707/999.1 |

(Continued)

FOREIGN PATENT DOCUMENTS

WO WO-2014150098 A1 * 9/2014 ......... G06F 16/2443

OTHER PUBLICATIONS

Manish Sharma, "How To Create PL/SQL Stored Procedures Without Parameters In Oracle Database", Jan. 11, 2019, pp. 1-3 (Year: 2019).*

(Continued)

*Primary Examiner* — Sherief Badawi
*Assistant Examiner* — Jessica N Le
(74) *Attorney, Agent, or Firm* — Lowenstein Sandler LLP

(57) ABSTRACT

An example method of using ad-hoc stored procedures for OLTP operations includes: identifying, by a processing device, one or more values for updating a dataset stored in a database; creating an ad-hoc stored procedure comprising a sequence of commands specifying atomically-executable database update operations with respect to the dataset, wherein the atomically-executable database update operations utilize the one or more values that are encoded into the sequence of commands by respective inline constant values; executing the ad-hoc stored procedure, wherein the executing comprises acquiring a temporary lock of at least part of the dataset; and dropping the ad-hoc stored procedure.

19 Claims, 5 Drawing Sheets

(52) U.S. Cl.
CPC ...... *G06F 16/2379* (2019.01); *G06F 16/2443* (2019.01); *G06F 16/252* (2019.01)

(58) Field of Classification Search
USPC .......................................................... 707/704
See application file for complete search history.

(56) References Cited

U.S. PATENT DOCUMENTS

| | | | | |
|---|---|---|---|---|
| 6,725,213 | B1* | 4/2004 | Chiocca | G06F 16/2443 |
| 7,058,620 | B1* | 6/2006 | Mandel, III | G06F 16/2443 |
| | | | | 707/999.005 |
| 7,720,884 | B1* | 5/2010 | Gandhi | G06F 16/217 |
| | | | | 707/804 |
| 9,734,222 | B1* | 8/2017 | Milne | G06F 7/00 |
| 10,545,957 | B1* | 1/2020 | Winiarski | G06F 16/248 |
| 11,061,965 | B1* | 7/2021 | Heisz | G06F 16/2471 |
| 11,256,684 | B1* | 2/2022 | Papakonstantinou | |
| | | | | G06F 16/2445 |
| 2003/0028498 | A1* | 2/2003 | Hayes-Roth | G06N 20/00 |
| | | | | 706/17 |
| 2003/0066053 | A1* | 4/2003 | Al-Azzawe | G06F 11/3624 |
| | | | | 709/224 |
| 2003/0159089 | A1* | 8/2003 | DiJoseph | G06F 11/3684 |
| | | | | 714/E11.208 |
| 2004/0162822 | A1* | 8/2004 | Papanyan | G06F 16/2453 |
| 2007/0208695 | A1* | 9/2007 | Burger | G06F 16/24553 |
| 2008/0034014 | A1* | 2/2008 | Beck | G06F 16/27 |
| 2009/0287737 | A1* | 11/2009 | Hammerly | G06F 16/288 |
| 2013/0151491 | A1* | 6/2013 | Gislason | G06F 16/2282 |
| | | | | 707/696 |
| 2013/0151591 | A1* | 6/2013 | Lee | H04N 21/25866 |
| | | | | 709/203 |
| 2013/0198218 | A1* | 8/2013 | Wu | G06F 16/278 |
| | | | | 707/E17.014 |
| 2014/0280324 | A1* | 9/2014 | Teletia | G06F 16/951 |
| | | | | 707/770 |
| 2016/0196295 | A1* | 7/2016 | Bhattacharjee | G06F 16/2315 |
| | | | | 707/607 |
| 2018/0082043 | A1* | 3/2018 | Witchey | G16H 10/60 |
| 2018/0260196 | A1* | 9/2018 | Andrews | G06F 16/2453 |
| 2019/0324952 | A1* | 10/2019 | Ying | G06F 16/21 |
| 2019/0354620 | A1* | 11/2019 | Eluri | G06F 16/2322 |
| 2020/0320069 | A1* | 10/2020 | Jeong | G06F 16/24522 |
| 2021/0240854 | A1* | 8/2021 | Krafcik | H04L 67/02 |
| 2021/0264420 | A1* | 8/2021 | Tammana | G06Q 20/02 |

OTHER PUBLICATIONS

Hannah Vernon, "Database Administrators: Transaction in a stored procedure", Apr. 1, 2016, Database Administrators, pp. 5 (Year: 2016).*

Solomon Rutzky and Frosty840, "How can I set a lock inside a stored procedure?", Nov. 20, 2014, 3 pages. (Year: 2014).*

WG, "Loop unrolling", Feb. 9, 2012, https://forums.ni.com/t5/LabVIEW-Idea-Exchange/Loop-unrolling/idi-p/1870107, Labview Idea Exchange, pp. 1-11. (Year: 2012).*

Tarang, "Using digest in a stored procedure #1096", Apr. 7, 2021, Supabase, pp. 2. (Year: 2021).*

"14.22.4 InnoDB Error Handling", https://docs.oracle.com/cd/E17952_01/mysql-5.7-en/innodb-error-handling.html, 1 page, [retrieved from the internet on May 25, 2022].

* cited by examiner

410

```
CREATE TABLE idempotency (
  Key VARCHAR(16) PRIMARY KEY,
)

CREATE TABLE counter (
  Ctr INT
)
```

420

```
DECLARE PROCEDURE tmp_9238209a9()
BEGIN
  DECLARE exit handler FOR SQLEXCEPTION BEGIN
    ROLLBACK
    RETHROW
  END;
  START TRANSACTION;
  INSERT INTO idempotency (Key) VALUES ("abcdef")
  INSERT INTO counter (Key) VALUES (1) ON DUPLICATE KEY UPDATE Ctr = Ctr + 1;
  COMMIT;
END
CALL tmp_9238209a9();
DROP PROCEDURE IF EXISTS tmp_9238209a9;
```

FIG. 4

USING AD-HOC STORED PROCEDURES FOR ONLINE TRANSACTION PROCESSING

REFERENCE TO RELATED APPLICATION

This application claims the benefit of U.S. Provisional Patent Application No. 63/235,049, filed Aug. 19, 2021, the entirety of which is incorporated by reference herein.

TECHNICAL FIELD

The present disclosure is generally related to computer systems, and is specifically related to systems and methods for using ad-hoc stored procedures for online transaction processing (OLTP).

BACKGROUND

Online Transaction Processing (OLTP) systems are expected to efficiently handle large incoming information streams, and thus should exhibit high transaction processing rates. Efficient transaction processing may be hindered, inter alia, by lock contention (i.e., situations in which a process attempts to acquire a lock that is held by another process).

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 illustrates example code snippets for implementing an idempotent counter by an ad-hoc stored procedure, in accordance with one or more aspects of the present disclosure.

DETAILED DESCRIPTION

Figure 1:
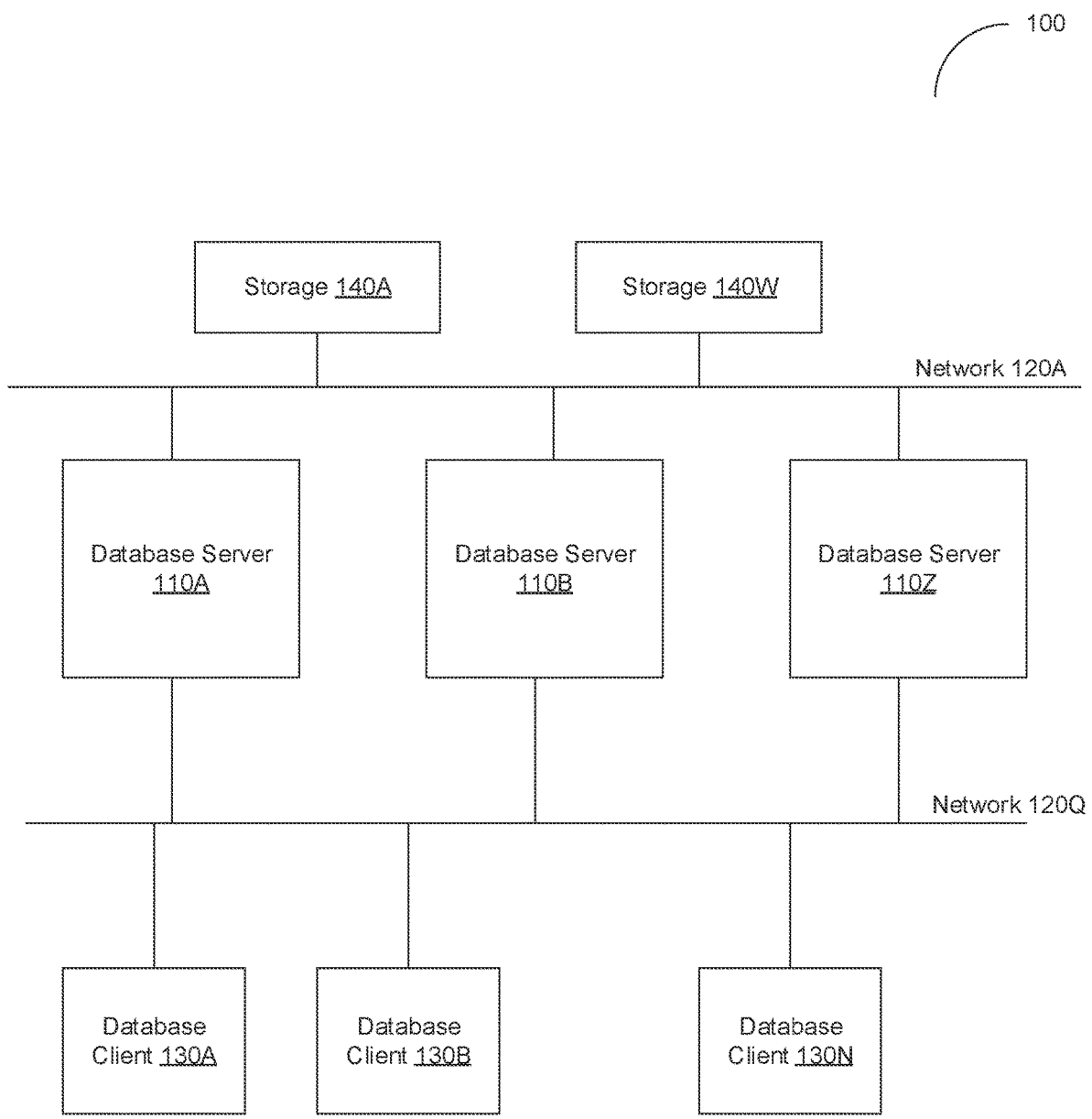
FIG. 1 schematically illustrates a high-level component diagram of an example distributed computer system, in which systems and methods described herein may operate.

Described herein are systems and methods for using ad-hoc stored procedures for online transaction processing (OLTP).

A database update operation may involve updating, creating, and/or deleting records of one or more database tables. The application logic may require that a sequence of update operations would be executed atomically, i.e., would either successfully complete in its entirety or have no effect on the information stored in the database in the case of failure of at least one operation in the sequence. Such a sequence of update operations is commonly referred to as a "transaction." In an illustrative example, a stream of billing events in a distributed communication system may be translated into one or more sequences of database update operations which should be executed as one or more transactions.

In terms of a high-level query language, a database update transaction may be specified by a sequence of database access commands (including information retrieval commands and database update commands) that is preceded by a transaction start command and is followed by a transaction commit command. Different query languages may utilize various keywords for denoting transaction start and commit commands.

Implementing the transactional execution mode may involve locking the affected database objects (e.g., tables, records, indexes, etc.) during the transactional execution, in order to prevent other database clients from accessing the partially updated data, which may be an in an inconsistent state. Different database management engines may utilize various lock granularities, priorities, scopes, as well as various mechanisms for lock contention resolution.

A database client application that executes a transaction to fetch and/or update one or more database objects may request appropriate locks from the database server. In particular, performing a sequence of update operations may require obtaining exclusive locks with respect to one or more database tables, pages, and/or records. While an exclusive lock is associated with a query being executed, no other locks may be granted with respect to the affected database objects. Accordingly, the adverse effect of database object locks upon the overall database performance may be alleviated by minimizing the number and duration of locks being active.

In various examples, command sequences that are executable in the transactional mode may include various database access commands including selecting, updating, deleting, inserting, etc., individual records or record sets. Accordingly, sequentially issuing these commands from the client (e.g., via one or more JDBC connections) may involve multiple round trips to the database while the affected record set is locked by the transaction being executed. "Round trip" herein refers to a sequence of operations that involves a database access command being issued by a database client, received and executed by the database server, and the execution result being forwarded to and received by the database client.

The systems and methods of the present disclosure optimize transactional execution by implementing ad-hoc stored procedures that are created immediately before their execution and, in some implementations, may be dropped immediately after their execution. Executing certain performance-critical command sequences within a stored procedure eliminates multiple database round trips that would be necessary if each command of the sequence was individually issued by the client. In order to minimize the stored procedure runtime, an ad-hoc stored procedure may be created with no parameters, by encoding all the necessary data directly into the queries of the transactional stream, thus avoiding parameter encoding and decoding, as described in more detail herein below.

Furthermore, the systems and methods of the present disclosure are well-suited to handle application-generated code in which a database transaction would have, within its scope, a variable (and thus often unpredictable) number of database access commands, e.g., controlled by a FOR or WHILE loop. The systems and methods of the present disclosure may effectively eliminate these flow control structures by effectively "unrolling" the loop into a linear sequence of operations to be performed by an ad-hoc stored procedure, thus introducing an additional performance improvement within a critical section (e.g., within the scope of an exclusive lock).

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 schematically illustrates a high-level component diagram of an example distributed computer system 100, in which systems and methods described herein may operate. The example diagram shown in FIG. 1 is provided for illustrative purposes only and does not in any way limit distributed database architectures in which implementations of the present disclosure may operate.

As shown in FIG. 1, the distributed computer system 100 may include one or more database servers 110A-110Z, which may be accessed, via one or more networks 120A-120Q, by one or more clients 130A-130N. Each of the servers 110A-110Z may be implemented by one or more computing systems (e.g., hardware servers) or by one or more virtual machines. Each of the clients 130A-130N may be implemented by one or more computing devices (e.g., personal computers (PC), tablet PCs, set-top boxes (STBs), Personal Digital Assistants (PDAs), smartphones, web appliances) or by one or more virtual machines. Networks 120A-120Q may be provided by one or more local area networks, wide area networks, virtual networks, or any combination thereof.

The database servers 110A-110Z may utilize the storage service implemented by one or more data storage devices 140A-140W (e.g., disks, RAID arrays, EEPROM devices, etc.). The storage service may implement a storage area network, a network-attached storage, and/or any various other storage architectures.

Each database server 110A-110Z may run a database management engine, which may be implemented by one or more software modules performing various database operations, including database object creation, update, and information retrieval. In various implementations, the database servers 110A-110Z may implement relational databases, NoSQL databases, hierarchical databases, and/or databases of various other architectures. Database servers 110A-110Z may implement ad-hoc stored procedures for OLTP operations, as described in more detail herein below.

In various implementations, the distributed computer system 100 may support data replication among the database servers 110A-110Z, load balancing to selectively forward client requests to one of the database servers 110A-110Z, and/or other functions related to providing database services, and may include various functional components that are omitted from FIG. 1 for clarity and conciseness.

A database client 130A-130N may create and transmit to a database server 110A-110N commands to create ad-hoc stored procedures. The database server 110A-110Z may generate and run the ad-hoc stored procedures, as described in more detail herein below.

Figure 2:
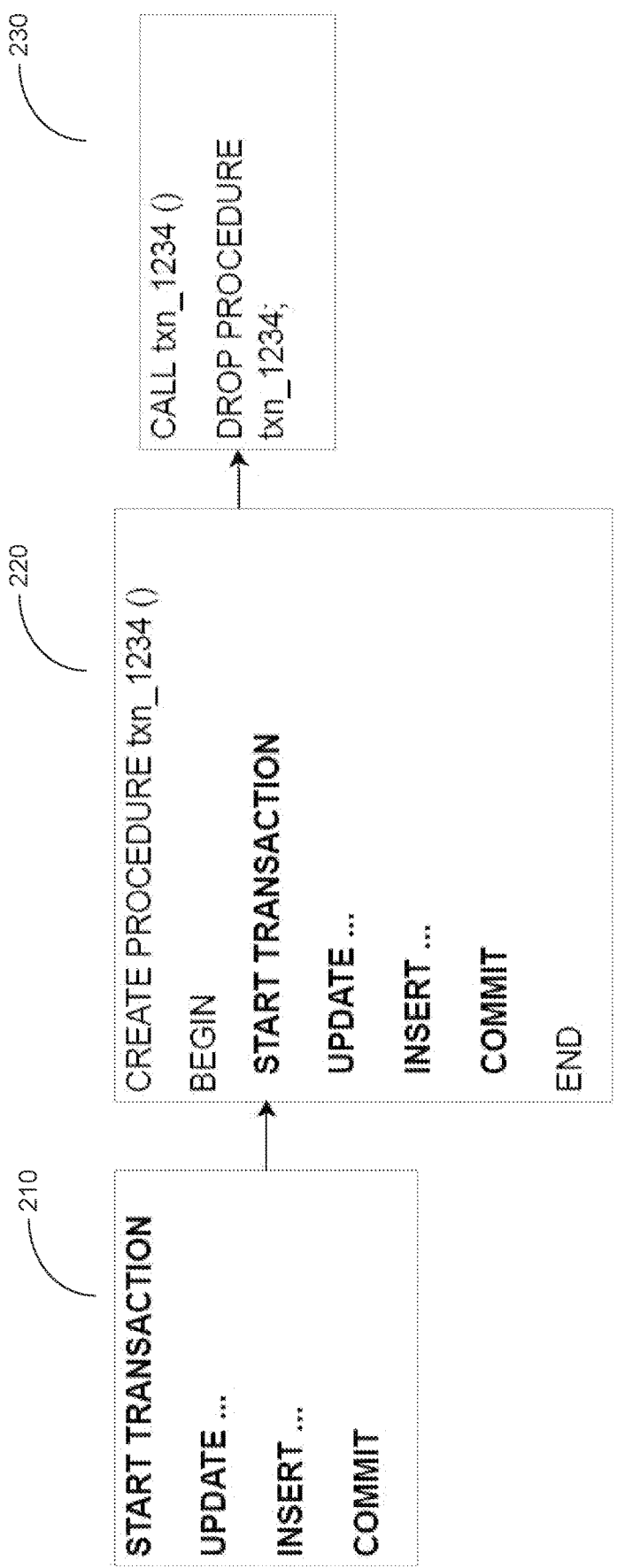
FIG. 2 schematically illustrates creation and usage of an ad-hoc stored procedure, in accordance with one or more aspects of the present disclosure.

FIG. 2 schematically illustrates creation and usage of an ad-hoc stored procedure, in accordance with one or more aspects of the present disclosure. Example code snippet 210 shows a sequence of database update operations to be executed in the transactional mode, such that if any of the update operation fails, the database updates that have been performed by the preceding update operations (i.e., the update operations following the transaction start command and preceding the failed operation) would be rolled back, and therefore these operations would have no effect on the information stored in the database.

Accordingly, the database client may issue a sequence of commands causing the database server to create an ad-hoc stored procedure (code snippet 220) for executing the sequence of database update commands of the code snippet 210. In the illustrative example of FIG. 2, the database client inserts the create procedure command and the begin command before the sequence of database update commands of the code snippet 210, and appends the end command after the sequence of database update commands of the code snippet 210.

The create procedure command may include the symbolic name of the stored procedure, which may be provided by an arbitrary alphanumeric string. In an illustrative example, the symbolic name of the stored procedure may be provided by a digest (e.g., MD5, SHA-1, or any other suitable hash function) of the text of the stored procedure, thus guaranteeing the uniqueness of the stored procedure name. In some implementations, the digest of the stored procedure text may be preceded by a predefined prefix including one or more alphanumeric characters or followed by a predefined suffix including one or more alphanumeric characters. In another illustrative example, the symbolic name of the stored procedure may be provided by a digest of textual representations of the data values to be utilized by the database update commands, optionally preceded by a predefined prefix including one or more alphanumeric characters or followed by a predefined suffix including one or more alphanumeric characters. In various other illustrative examples, various other methods of generating the stored procedure name may be implemented.

As noted herein above, in order to minimize the stored procedure runtime, an ad-hoc stored procedure may be created with no parameters: all the necessary data may be encoded directly into the text, thus avoiding encoding and decoding of parameter values. The ad-hoc procedure may include one or more database update commands to be executed within the scope of a database update transaction. An example database update command of an ad-hoc stored procedure would include a verb indicating the desired action (e.g., UPDATE, INSERT, etc.), one or more names of the affected database objects (e.g., database tables, table columns, etc.), other reserved words (e.g., the word VALUES preceding the list of values to be inserted into the specified table), and one or more immediate operands (i.e., inline constant values, e.g., as numeric values or alphanumeric strings) to be utilized by the database update command.

In order to generate the text of the stored procedure, the database client may utilize one or more stored templates. Each of the templates may include the text of a database update command with placeholders substituting specific data values to be supplied at runtime. Thus, the ad-hoc procedure is generated by programmatically by concatenating multiple commands generated from respective templates with specific parameter values according to an arbitrary business logic.

Upon executing the code snippet 220, the created stored procedure may be invoked by its name, as shown by the code snippet 230. The database update commands of the stored procedure are executed in the transactional execution mode. Accordingly, while executing each update command may involve acquiring temporary locks of the affected database objects, no intervening transfers of execution control back to the client would be performed between acquiring and releasing any lock within the scope of the transaction.

In some implementations, as illustrated by the example code snippet 230, the stored procedure may be dropped immediately after their execution. Alternatively, the stored procedure may be kept in the database and eventually re-used.

For re-using a stored procedure, the database client may compute a digest of textual representations of the data values to be utilized by the database update commands, optionally preceded by a predefined prefix including one or more alphanumeric characters or followed by a predefined suffix including one or more alphanumeric characters. Should a stored procedure with a name that would include the computed digest be found in the database, it may be executed; otherwise, a new stored procedure may be created.

While the examples presented herein utilize Structured Query Language (SQL), the systems and methods of the present disclosure are not limited to any particular database architecture or query language.

Figure 3:
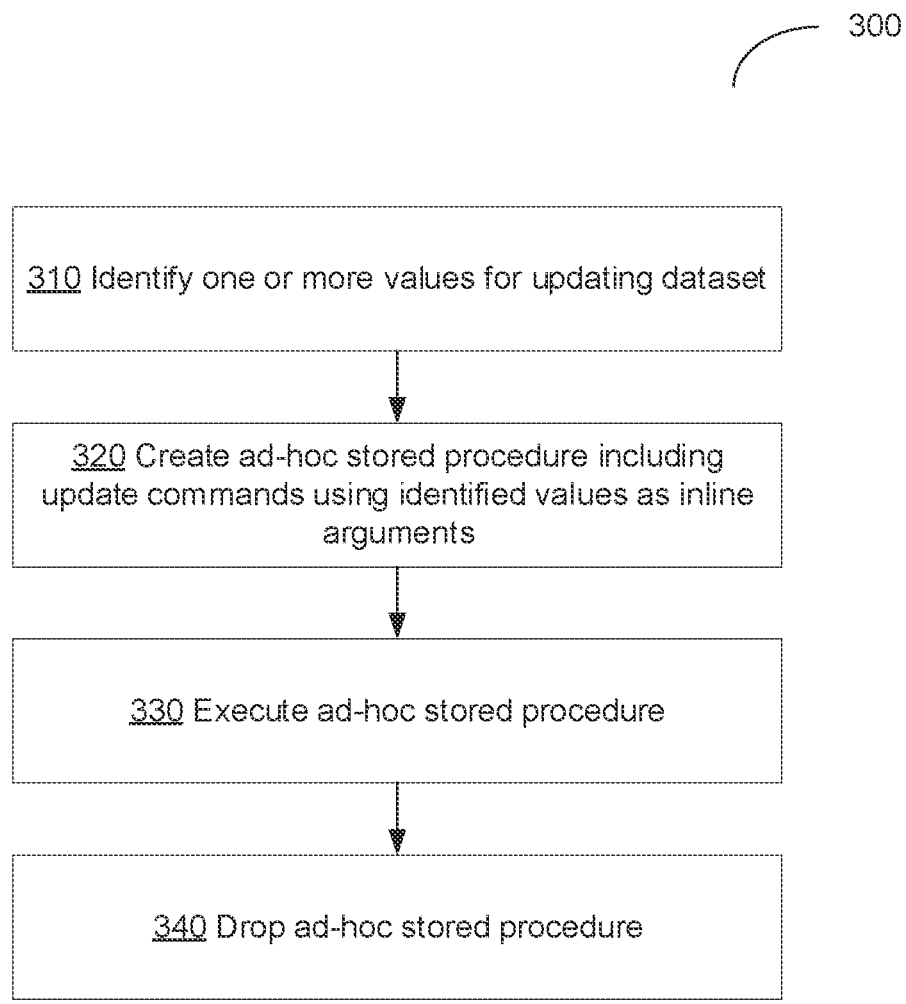
FIG. 3 depicts a flow diagram of an example method 300 of using ad-hoc stored procedures for OLTP operations, in accordance with one or more aspects of the present disclosure.

FIG. 3 depicts a flow diagram of an example method 300 of using ad-hoc stored procedures for OLTP, in accordance with one or more aspects of the present disclosure. Method 300 and/or each of its individual functions, routines, subroutines, or operations may be performed by one or more processors of the computer system (e.g., computer system 1000 of FIG. 5) implementing the method. In an illustrative example, method 300 may be implemented by a database server 110A-110Z of FIG. 1.

In some implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the computer system implementing the method identifies one or more values for updating a dataset stored in a database. The dataset may be provided by at least a part of one or more tables of the database. In an illustrative example, if a new record needs to be inserted into a database table, the computer system would identify a set of values (e.g., numeric values or alphanumeric strings) corresponding to the fields of the new record.

At block 320, the computer system creates an ad-hoc stored procedure, which includes a sequence of commands specifying atomically-executable database update operations with respect to the dataset. The atomically-executable database update operations would utilize the values identified at block 310, which are encoded into the sequence of commands by respective inline constant values. Thus, the ad-hoc stored procedure accepts no parameters. In an illustrative example, the ad-hoc stored procedure includes a transaction start command, one or more database update commands utilizing the values identified at block 310, and a transaction commit command. In some implementations, the ad-hoc stored procedure may be assigned an alphanumeric identifier, which may include a digest of the text of the ad-hoc stored procedure and/or a digest of the values identified at block 310.

At block 330, the computer system executes the ad-hoc stored procedure. Executing the ad-hoc stored procedure may involve atomically executing the specified sequence of database update operations. The atomic execution may involve, responsive to detecting a failure of an update operation, rolling back the database updates that have been performed by the preceding operations within the scope of the transaction. Executing the database update operations may involve acquiring temporary locks of the affected database objects. The acquired locks would be released within the transaction scope, without an intervening transfer of execution control to a client of the database, as described in more detail herein above.

At block 340, the computer system drops the ad-hoc stored procedure. As noted herein above, in some implementations, the ad-hoc stored procedure may be kept for future re-use, and thus, operations of block 340 may be omitted.

In an illustrative example, the systems and methods described herein may be utilized for implementing an idempotent counter, as schematically illustrated by the example of FIG. 4, which illustrates example code snippets for implementing an idempotent counter by an ad-hoc stored procedure, in accordance with one or more aspects of the present disclosure. By definition, the idempotent counter would not be incremented when the same insert operation is attempted multiple times. The code snippet 410 declares the example tables: Idempotency table and Counter table. Idempotency table includes the only column of character strings, which is declared as the primary key for the table (i.e., duplicate values of the keys are not allowed). Counter table includes the only column of integer values. The code snippet 420 for creating an ad-hoc stored procedure for updating both tables. Notably, upon second or subsequent execution of the stored procedure, the counter value will not be incremented since the error in the preceding update operation will cause the roll back of the transaction. Since all locks are acquired and released within the scope of the transaction, no intervening transfers of execution control back to the client would be performed between acquiring and releasing any lock.

Figure 5:
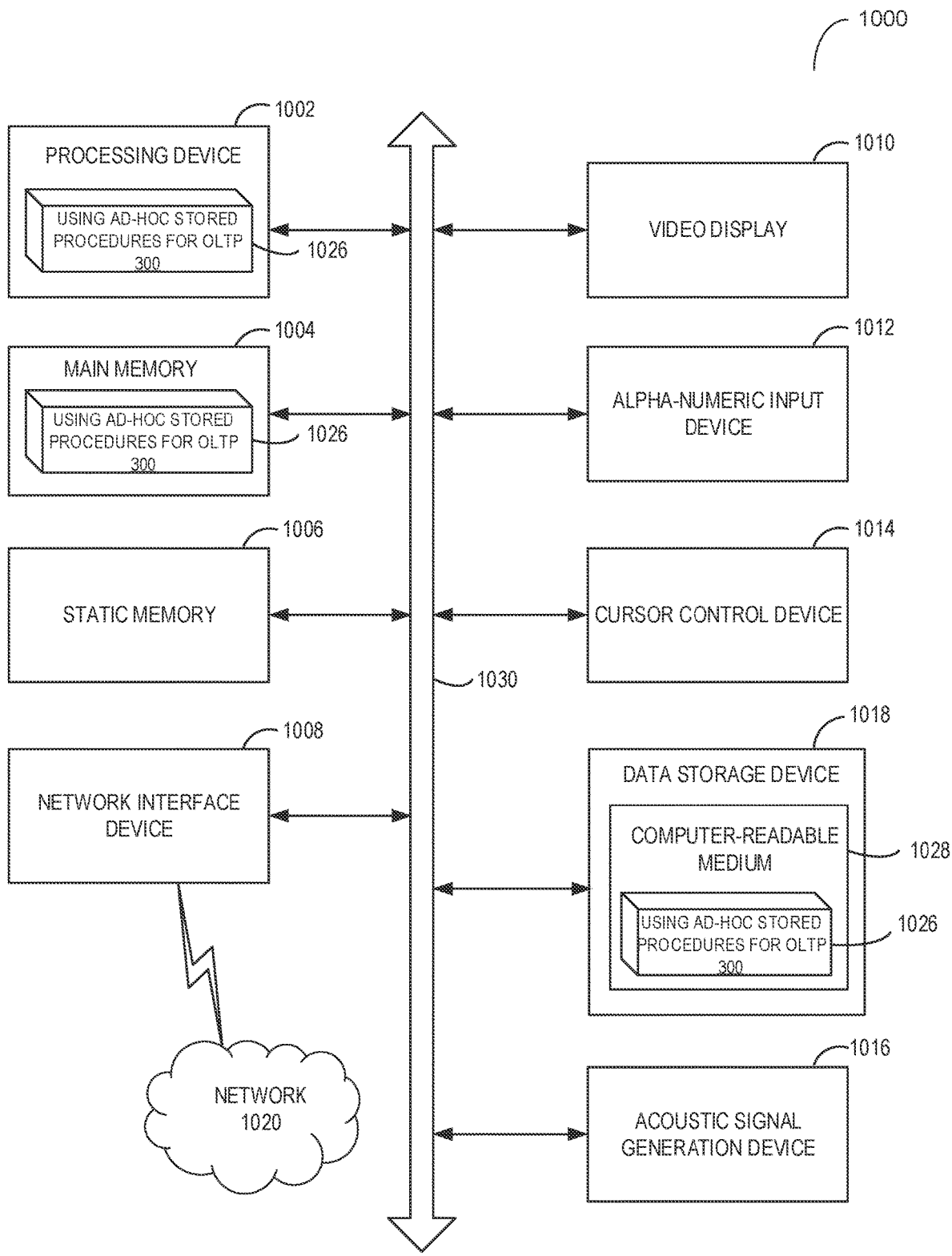
FIG. 5 depicts a block diagram of an example computer system operating in accordance with one or more aspects of the present disclosure.

FIG. 5 schematically illustrates a component diagram of an example computer system 1000, which may perform any one or more of the methods described herein. Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a mobile communication device (such as a smartphone), a notebook computer, a desktop computer, a server computer, a network appliance, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 400 of using ad-hoc stored procedures for OLTP operations, in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 400 of using ad-hoc stored procedures for OLTP operations, in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required operations, functions, or methods. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   generating, by a processing device, based on one or more templates, a create procedure command for updating a dataset stored in a database, wherein each template of the one or more templates comprises a text of a database update command, the text comprising one or more placeholders for respective data values;

creating, by executing the create procedure command, an ad-hoc stored procedure comprising a sequence of database access commands specifying atomically-executable database update operations with respect to the dataset, wherein the atomically-executable database update operations utilize one or more values that are encoded into the sequence of database access commands by respective inline constant values substituting the one or more placeholders, wherein a procedure name of the ad-hoc stored procedure comprises a digest of the one or more values that are encoded into the sequence of commands by respective inline constant values; and executing the ad-hoc stored procedure, wherein the executing comprises:

acquiring a temporary lock of at least part of the dataset, transforming a loop within the ad-hoc stored procedure into a linear sequence of operations, performing the atomically-executable database update operations with respect to the dataset, and releasing the temporary lock, with no intervening transfers of execution control to a client between acquiring and releasing the temporary lock.

2. The method of claim 1, wherein the ad-hoc stored procedure accepts no parameters.

3. The method of claim 1, wherein the dataset comprises one or more records of a table of the database.

4. The method of claim 1, wherein the atomically-executable database update operations update, using the one or more values, one or more records of one or more tables of the database.

5. The method of claim 1, wherein the ad-hoc stored procedure comprises: a transaction start command, one or more database update commands referencing the one or more values, and a transaction commit command.

6. The method of claim 1, further comprising:

responsive to detecting a failure of an operation of the atomically-executable database update operations, rolling back database updates that have been performed by preceding operations of the atomically-executable database update operations.

7. The method of claim 1, wherein the procedure name of the ad-hoc stored procedure further comprises at least one of: a predefined prefix including one or more alphanumeric characters or a predefined suffix including one or more alphanumeric characters.

8. The method of claim 1, further comprising:

keeping the ad-hoc stored procedure in the database; and re-using the ad-hoc stored procedure.

9. A system, comprising:

a memory; and a processing device, coupled to the memory, the processing device to:

generate, based on one or more templates, a create procedure command for updating a dataset stored in a database, wherein each template of the one or more templates comprises a text of a database update command, the text comprising one or more placeholders for respective data values;

create, by executing the create procedure command, an ad-hoc stored procedure comprising a sequence of database access commands specifying atomically-executable database update operations with respect to the dataset, wherein the atomically-executable database update operations utilize one or more values that are encoded into the sequence of database access commands by respective inline constant values substituting the one or more placeholders, wherein a procedure name of the ad-hoc stored procedure comprises a digest of the one or more values that are encoded into the sequence of commands by respective inline constant values; and execute the ad-hoc stored procedure, wherein the executing comprises:

acquiring a temporary lock of at least part of the dataset, transforming a loop within the ad-hoc stored procedure into a linear sequence of operations, performing the atomically-executable database update operations with respect to the dataset, and releasing the temporary lock, with no intervening transfers of execution control to a client between acquiring and releasing the temporary lock.

10. The system of claim 9, wherein the ad-hoc stored procedure accepts no parameters.

11. The system of claim 9, wherein the atomically-executable database update operations update, using the one or more values, one or more records of one or more tables of the database.

12. The system of claim 9, wherein the ad-hoc stored procedure comprises: a transaction start command, one or more database update commands referencing the one or more values, and a transaction commit command.

13. The system of claim 9, wherein the processing device is further to: responsive to detecting a failure of an operation of the atomically-executable database update operations, roll back database updates that have been performed by preceding operations of the atomically-executable database update operations.

14. A non-transitory computer-readable storage medium comprising executable instructions that, when executed by a computer system, cause the computer system to:

generate, based on one or more templates, a create procedure command for updating a dataset stored in a database, wherein each template of the one or more templates comprises a text of a database update command, the text comprising one or more placeholders for respective data values;

create, by executing the create procedure command, an ad-hoc stored procedure comprising a sequence of database access commands specifying atomically-executable database update operations with respect to the dataset, wherein the atomically-executable database update operations utilize one or more values that are encoded into the sequence of database access commands by respective inline constant values substituting the one or more placeholders, wherein a procedure name of the ad-hoc stored procedure comprises a digest of the one or more values that are encoded into the sequence of commands by respective inline constant values; and execute the ad-hoc stored procedure, wherein the executing comprises:

acquiring a temporary lock of at least part of the dataset, transforming a loop within the ad-hoc stored procedure into a linear sequence of operations, performing the atomically-executable database update operations with respect to the dataset, and releasing the temporary lock, with no intervening transfers of execution control to a client between acquiring and releasing the temporary lock.

15. The non-transitory computer-readable storage medium of claim 14, wherein the atomically-executable database update operations update, using the one or more values, one or more records of one or more tables of the database.

16. The non-transitory computer-readable storage medium of claim 14, wherein the ad-hoc stored procedure comprises: a transaction start command, one or more database update commands referencing the one or more values, and a transaction commit command.

17. The non-transitory computer-readable storage medium of claim 14, further comprising executable instructions that, when executed by the computer system, cause the computer system to:
responsive to detecting a failure of an operation of the atomically-executable database update operations, rolling back database updates that have been performed by preceding operations of the atomically-executable database update operations.

18. The non-transitory computer-readable storage medium of claim 14, wherein the ad-hoc stored procedure accepts no parameters.

19. The non-transitory computer-readable storage medium of claim 14, wherein the dataset comprises one or more records of a table of the database.

* * * * *